: 3,149,086
Patented Sept. 15, 1964

3,149,086
CEMENTITIOUS COATING COMPOSITION CONTAINING CHLOROSULFONATED POLYETHYLENE
Clarence D. Moore, Manor Township, Lancaster County, Pa., assignor to Armstrong Cork Company, Lancaster, Pa., a corporation of Pennsylvania
No Drawing. Filed May 15, 1961, Ser. No. 109,855
8 Claims. (Cl. 260—29.6)

This invention relates generally to coatings, and more particularly to curable coatings. Still more particularly, the invention relates to a curable masonry paint or coating composition adapted to repair and waterproof walls, steps, floors, and the like.

The invention contemplates a water-activatable composition comprising chlorosulfonated polyethylene dissolved in a solvent therefor, and Portland cement. Just prior to use, sufficient water is added to cause the cure of the Portland cement. The composition may then be sprayed, rolled, brushed, or otherwise applied to a surface. The composition will cure in place producing a tough, strong, wear-resistant, water-repellent film.

The chlorosulfonated polyethylene used in the present invention is a known item of commerce and is produced by reacting polyethylene with chlorine and sulfur dioxide. The polyethylene used in the manufacture of chlorosulfonated polyethylene will normally have a number average molecular weight of about 20,000. The sulfur content of the chlorosulfonated polyethylene will generally run in the range of about 1.2%–1.7% by weight sulfur, while the chlorine content will generally run about 26%–40% by weight chlorine. The chlorosulfonated polyethylene contains approximately one chlorine atom for each group of seven carbon atoms and one sulfonyl chloride group for each group of 90 carbon atoms along the polyethylene chain. The molecular weight of the chlorosulfonated polyethylene should not be too high to prevent reasonable solids content at the application consistency of the final composition. Additionally, the chlorosulfonated polyethylene molecules should be such that they can be cross-linked by curing agents to produce tough, resilient coatings. The chlorosulfonated polyethylene is cured or cross-linked by reaction of the sulfonyl chloride groups with curing agents. Such curing agents are litharge, tribasic lead maleate, magnesium oxide, and resins such as epoxy resins and polyamide resins. In order to accomplish room temperature cure of the chlorosulfonated polyethylene, it is generally preferable that the composition contain a metal oxide such as litharge, an organic acid such as a wood rosin, and a sulfur-type accelerator such as 2-benzothioazoyl disulfide.

The chlorosulfonated polyethylene is to be dissolved in the solvent therefor. Such solvents are the higher ketones such as methyl ethyl ketone, methyl isobutyl ketone, and the like. Aromatic solvents are also suitable; these are solvents containing a relatively high proportion of aromatic rings. Such solvents are benzene, toluene, the xylenes, various naphthalenes, and mixtures thereof, certain chlorinated hydrocarbons such as ethylene dichloride, dichloroethylene, methylene dichloride, and others.

The chlorosulfonated polyethylene is taken up in the solvent in a convenient concentration, for example, from 5%–50% by weight chlorosulfonated polyethylene based on the weight of the solution.

Portland cement is the next critical ingredient. The cement may simply be stirred into the solution of chlorosulfonated polyethylene. If the solution possesses sufficiently high viscosity such as would be obtained where the chlorosulfonated polyethylene concentration is about 20% by weight or higher, most of the Portland cement will remain suspended in the solution. In any case, a simple and quick stirring prior to use will resuspend the Portland cement in the organic solution. The amount of Portland cement to be added will generally be in the range of about 10 parts by weight to 100 parts by weight Portland cement based on 100 parts by weight chlorosulfonated polyethylene.

The above-described composition is the basic composition. The chlorosulfonated polyethylene solution containing Portland cement is activated prior to use by adding water thereto. The amount of water to be added to cause hydration of the cement will be in the range of about 50–100 parts by weight water per 100 parts by weight of the Portland cement. The water is simply poured into the rubber solution containing the Portland cement with stirring. The activated composition is then ready for application to the surface to be treated.

Additional ingredients are sometimes desirable. For example, a pigment such as titanium dioxide, iron oxide, or any other convenient pigment may be added in order to color the composition and render it attractive in appearance. Pigments will be added in the amounts necessary to produce the desired color and hiding power of the resulting paint. Frequently the amount of pigment will be from 10–60 parts by weight per 100 parts by weight of the chlorosulfonated polyethylene.

One or more resins may also be dissolved in the solution in order to impart various additional properties to the composition. Oil-soluble, phenol-formaldehyde resins made with an excess of formaldehyde may be useful in relatively small amounts as fortifying resins in order to impart extra strength to the resulting cured coating. Such resins, if used, are advantageously used in an amount of about 5–25 parts by weight phenol-formaldehyde resin per 100 parts by weight of the chlorosulfonated polyethylene. A hydrogenated wood rosin may aid in curing the chlorosulfonated polyethylene after the solvent has evaporated from the composition. Additional curing agents may be used in order to hasten the cure of the chlorosulfonated polyethylene. Such agents are known in the art and may advantageously be such known curing agents as tribasic lead maleate, tetramethyl thiuram disulfide, 2-benzothioazoyl disulfide, and other known accelerators and curing agents.

The addition of these agents will be in the amount necessary to produce cure of the chlorosulfonated polyethylene. Accelerators are used in small amounts, generally from 1–2 parts by weight per 100 parts by weight of the chlorosulfonated polyethylene.

A chlorinated hydrocarbon rubber is advantageously added in order to impart better adhesion of the coating composition to a wide variety of substrates to which it is to be applied. Chlorinated rubber is advantageously added in an amount of about 10–40 parts by weight per 100 parts by weight of the chlorosulfonated polyethylene.

The composition of the present invention may be painted onto the interior walls of basements and garages in order to waterproof and seal those walls and to render them attractive. The composition of the present invention is also an excellent sealing and patching paint for use in swimming pools, on walkways, and on garage floors.

It is completely unexpected to find that the mixture of chlorosulfonated polyethylene and Portland cement serves so well as a masonry paint or coating composition in view of the fact that the chlorosulfonated polyethylene alone is not suitable. Additionally, it would normally be expected that the addition of water to the composition in order to activate the composition would promptly precipitate the chlorosulfonated polyethylene from solution in the organic solvent. Such does not occur, possibly because of sufficient immediate reaction between the water and the Portland cement. Once the water has been added to the coating composition, the composition should be used within about two hours. The resulting film will be strong, flexible, tough, and weather and traffic resistant.

The following example illustrates an embodiment of the invention.

*Example*

The following composition was made by dissolving the ingredients in the order listed in a solvent system made by mixing 360 parts by weight xylene and 40 parts by weight isopropanol.

| Ingredients: | Parts by weight |
|---|---|
| Chlorosulfonated polyethylene (Hypalon 30) | 100 |
| Tribasic lead maleate (Tri Mal) | 40 |
| Iron oxide pigment | 40 |
| Portland cement | 50 |
| Tetramethyl thiuram disulfide (Thiuram M) | 0.5 |
| 2-benzothioazoyl disulfide (MBTS) | 1.0 |
| Hydrogenated wood rosin (Stabelite resin) | 3.0 |
| Chlorinated rubber (Parlon) | 25 |
| Oil-soluble, phenol-formaldehyde resin (CKR–5254) | 15 |

To activate the above composition, 40 parts by weight water was added with stirring.

The resulting composition was painted on outdoor concrete steps. After drying, a tough, strong film covered the steps. This film wore well for two years under moderately heavy traffic.

I claim:

1. A water-activatable composition comprising chlorosulfonated polyethylene dissolved in a solvent therefor, and Portland cement in an amount of 10–100 parts by weight per 100 parts by weight of said chlorosulfonated polyethylene.

2. A composition according to claim 1 wherein said solvent contains 10%–50% by weight chlorosulfonated polyethylene.

3. A composition according to claim 1 containing curing accelerators for said chlorosulfonated polyethylene.

4. A composition according to claim 1 containing a chlorinated rubber.

5. A composition according to claim 1 containing a fortifying resin consisting essentially of a phenol-formaldehyde resin.

6. A water-activatable composition comprising chlorosulfonated polyethylene dissolved in a solvent therefor, Portland cement in an amount of 10–100 parts by weight per 100 parts by weight of said chlorosulfonated polyethylene, a pigment, a curing accelerator for said chlorosulfonated polyethylene, a chlorinated rubber, and a fortifying resin consisting essentially of a phenol-formaldehyde resin.

7. A curable composition comprising chlorosulfonated polyethylene dissolved in a solvent therefor, Portland cement in an amount of 10–100 parts by weight per 100 parts by weight of said chlorosulfonated polyethylene, and water.

8. A curable composition comprising a solvent for chlorosulfonated polyethylene, relative proportions of 100 parts by weight chlorosulfonated polyethylene dissolved in said solvent, 10–100 parts by weight Portland cement, and 10–100 parts by weight water.

References Cited in the file of this patent

UNITED STATES PATENTS

| 1,940,528 | Bond | Dec. 19, 1933 |
| 2,556,575 | Cubberley et al. | June 12, 1951 |
| 2,662,064 | Mead | Dec. 8, 1953 |
| 2,809,950 | Bowers | Oct. 15, 1957 |

OTHER REFERENCES

Lieberman: "Compatability of Hypalon with Paint Resins and Oils," Du Pont Company Paint Bulletin PB–8, December 1959 (pages 1–7 relied on).